(12) United States Patent
Gohil

(10) Patent No.: US 8,753,728 B2
(45) Date of Patent: Jun. 17, 2014

(54) TOUGHENED POLYESTER BLENDS

(71) Applicant: E I Du Pont De Nemours and Company, Wilmington, DE (US)

(72) Inventor: Rameshchandra M Gohil, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/719,637

(22) Filed: Dec. 19, 2012

(65) Prior Publication Data

US 2013/0171383 A1 Jul. 4, 2013

Related U.S. Application Data

(60) Provisional application No. 61/580,746, filed on Dec. 28, 2011.

(51) Int. Cl.
| | |
|---|---|
| *B29D 22/00* | (2006.01) |
| *C08L 67/02* | (2006.01) |
| *C08L 67/04* | (2006.01) |
| *C08L 3/02* | (2006.01) |
| *C08L 51/06* | (2006.01) |
| *C08L 3/00* | (2006.01) |

(52) U.S. Cl.
CPC ............ *C08L 67/02* (2013.01); *C08L 67/04* (2013.01); *C08L 3/02* (2013.01); *C08L 51/06* (2013.01); *C08L 3/00* (2013.01)
USPC ........ 428/35.7; 428/35.1; 428/36.92; 525/64; 525/448

(58) Field of Classification Search
CPC .......... C08L 67/02; C08L 3/02; C08L 51/06; C08L 67/04; C08L 3/00
USPC ................. 428/35.7, 35.1, 221; 525/64, 448; 524/47, 52
See application file for complete search history.

(56) References Cited

U.S. PATENT DOCUMENTS

| | | | | |
|---|---|---|---|---|
| 6,660,796 | B2 * | 12/2003 | Schueler et al. | 524/495 |
| 7,740,952 | B2 * | 6/2010 | Hausmann et al. | 428/522 |
| 8,273,850 | B2 * | 9/2012 | Gohil | 528/272 |
| 2002/0115771 | A1 | 8/2002 | Schueler et al. | |
| 2010/0151165 | A1 * | 6/2010 | Gohil | 428/35.1 |
| 2010/0151167 | A1 * | 6/2010 | Gohil | 428/35.5 |
| 2010/0317772 | A1 | 12/2010 | Lin | |
| 2012/0071927 | A1 * | 3/2012 | Beger et al. | 606/255 |
| 2013/0171383 | A1 * | 7/2013 | Gohil | 428/35.1 |
| 2013/0171393 | A1 * | 7/2013 | Kannankeril et al. | 428/36.9 |
| 2013/0172456 | A1 * | 7/2013 | Gohil et al. | 524/114 |

FOREIGN PATENT DOCUMENTS

| | | |
|---|---|---|
| EP | 1217038 A2 | 10/2001 |
| JP | 01174555 A | 7/1989 |
| WO | 2007095709 A1 | 8/2007 |

OTHER PUBLICATIONS

Ramesh Gohil, Properties and Straing Hardening Character of Polyethylene Terephthalate Containing Isosorbide, Polymer Engineering and Science (2009), pp. 544-553.
N. C. Liu et al., Types of Reactive Polymer Used in Blending, From Reactive Polymer Blending, 1st Edition, W. E. Barker et al., Editors, Carl Hanser Publishing (2001), pp. 13-42.

* cited by examiner

*Primary Examiner* — N. Edwards

(57) ABSTRACT

The properties of melt blends of specific aliphatic-aromatic copolyesters and starch are improved by addition of a combination of polylactic acid, graft copolymers such maleic anhydride grafted polyethylene and maleic anhydride grafted polystyrene, and a hindered phenolic antioxidant. The blends exhibit increased melt strength and maximum draw down ratio versus blends of only aliphatic-aromatic copolyesters and starch. Films made from the blend are compostable and exhibit an attractive combination of mechanical and rheological properties for packaging materials.

12 Claims, No Drawings

TOUGHENED POLYESTER BLENDS

FIELD OF THE INVENTION

This invention relates to blends of polyester copolymers that have adequate toughness and melt strength to make films suitable for packaging. The polyester compositions are biodegradable.

BACKGROUND

There is a growing desire to develop biodegradable film, especially such film suitable for packaging, and an increasing desire for packaging materials that can be made using biologically-derived and/or renewable sources. The current industry standard for biodegradable packaging film is Ecoflex® polyester, a commercial biodegradable copolyester based on 1,4-butanediol ("4G"), terephthalic acid ("T"), and adipic acid. Such copolyesters are sometimes referred to as "4GTX" where "X" is a linear aliphatic dicarboxylic acid, here, adipic acid. Starch is also blended with such polymers because it can increase the renewable content and degradability of the polymer and lower its cost.

Biologically sourced 1,4-butanediol is not currently readily available, but 1,3-propanediol ("3G") is. As one alternative to 4GTX, biodegradable copolyesters "3GTX" can be prepared based on 3G, T, and an aliphatic dicarboxylic acid. However, it can be difficult to obtain properties suitable for film with 3GTX/starch. Material for packaging film requires high maximum melt draw during manufacture, and the resulting film has to have adequate mechanical properties, such as toughness. A film of a specific composition made on a lab scale may have adequate toughness, as indicated by the percentage elongation or the area under the stress-strain curve, but to manufacture a film requires an adequate melt strength (defined as maximum draw times melt tension) to permit melt blowing processing, to achieve molecular orientation in films, and to promote strain hardening (strain-induced crystallization) during film blowing.

It is difficult to make 3GTX directly with high enough inherent viscosity (IV) for film, so instead a lower IV copolymer can be made and then built up using a chain extender, e.g., 4,4'-diphenylmethane diisocyanate (MDI). However, this approach can be detrimental to the toughness of films of 3GTX blends. There remains a need for formulations suitable for films, preferably with biodegradable and/or renewable content, that are biodegradable, possess sufficient melt strength for processing such as film blowing, and produce films with desirable physical properties.

SUMMARY OF THE INVENTION

One aspect of the present invention is a composition comprising a blend of a copolyester made from monomers comprising 1,3-propanediol, terephthalic acid, and a linear aliphatic dicarboxylic acid; a starch; polylactic acid; and a graft copolymer. The composition can further comprise additives such as a hindered phenol antioxidant. In one embodiment, the copolyester is poly(trimethylene terephthalate-co-sebacate).

DETAILED DESCRIPTION

As used herein, the term "aliphatic dicarboxylic acid" means a compound described by the formula

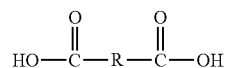

wherein R is a divalent group that contains no aromatic rings.

As used herein, the term "(co)extrusion" encompasses both extrusion and co-extrusion.

As used herein, the term "3GT" denotes poly(trimethylene terephthalate).

As used herein, the term "3GTX" denotes poly(trimethylene terephthalate-co-X), where X is derived from a linear aliphatic dicarboxylic acid.

As used herein, the term "packaging" means either an entire package or a component of a package.

As used herein, the term "acid equivalent" means compounds that perform substantially like the specific acid in reaction with polymeric glycols and diols.

As used herein, the term "starch" refers to a polysaccharide carbohydrate consisting of a large number of glucose units joined together by glycosidic bonds produced by essentially any green plant. "Thermoplastic starch" does not contain or require a plasticizer. Starch whose processability is significantly enhanced by a plasticizer is referred to here as "non-thermoplastic starch."

As used herein, the term "high amylose starch" refers to any starch with an amylose content of at least 45%, and preferably at least 65% by weight.

As used herein, the term "melt blend" (blending, blends, blended) refers to a material prepared by intimately mixing molten materials.

As used herein, the term "polyolefin" refers to a polymer derived from a hydrocarbon containing at least one carbon-carbon double bond.

It has now been found that including less than 15 wt % polylactic acid (PLA) in blends of an aliphatic-aromatic copolyester (made from monomers comprising 1,3-propanediol, terephthalic acid, and a linear aliphatic dicarboxylic acid, X) with starch provides an unexpected increase in the maximum draw and melt tension of the copolymer and blends thereof with starch. Furthermore, it has been found that the addition of less than 5 wt % of a graft polyolefin copolymer (e.g., polyethylene-graft-maleic anhydride ("PE-g-MA"), or polystyrene-graft-maleic anhydride ("PS-g-MA") provides improved processing and properties. It has further been found that the addition of 0.5-1.0 wt % of a hindered phenol antioxidant, particularly 3-(3,5-di-tert-butyl-4-hydroxyphenyl)-propionate provides improved maximum draw, which further improves when the percentage of starch in the blend is increased.

Blend Components 1. 3GTX Copolyesters

The blend composition is about 50 to about 70% 3GTX copolyester by weight. In some embodiments, the amount of 3GTX copolyester is between and optionally including any two of the following values: 50, 55, 60, 65, and 70 wt %, based on the weight of the blend composition.

Linear Aliphatic Dicarboxylic Acids

The 3GTX copolyester used in the compositions and methods disclosed herein typically contains from about 20 to 26 mole percent linear aliphatic dicarboxylic acid moieties ("X"). It has been found that the linear aliphatic dicarboxylic acid content can affect the percent elongation of the polymer, crystallinity, melting point, and biodegradability. In addition, the molecular weight of the copolymer or its intrinsic viscosity (IV) also influences the percent elongation. For film manufacture, an elongation at break of the polymer greater than 500 percent at 20"/min strain rate is desired.

Examples of suitable aliphatic dicarboxylic acids and acid equivalents include: succinic acid, succinic anhydride, dimethyl succinate, 2-methylsuccinic acid, sebacic acid, glutaric acid, dimethyl glutarate, adipic acid, azelaic acid, 3-hexenedioic acid, pimelic acid, suberic acid, 1,4-cyclohexanedicarboxylic acid, 1,3-cyclohexanedicarboxylic acid, 1,4-cyclohexanediacetic acid, 1,3-cyclohexanediacetic acid, undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, and mixtures thereof. Many suitable aliphatic dicarboxylic acids and acid equivalents are biologically derived, and use of such biologically derived compounds is preferred.

Preferably, the linear aliphatic dicarboxylic acid component is derived from a renewable biological source, in particular sebacic acid. However, essentially any linear aliphatic dicarboxylic acid or derivative known can be used, including mixtures thereof.

1,3-Propandiol

The copolyester used in the embodiments disclosed herein is preferably made using 1,3-propanediol obtained biochemically from a renewable source ("biologically-derived" 1,3-propanediol). A particularly preferred source of 1,3-propanediol is via a fermentation process using a renewable biological source.

Preferably, the 1,3-propanediol used as a reactant or as a component of the reactant in making the copolyester disclosed herein will have a purity of greater than about 99%, and more preferably greater than about 99.9% by weight, as determined by gas chromatographic analysis.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having a CIELAB "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

Polymerization

3GTX is an aliphatic-aromatic copolyester made by polycondensation of terephthalic acid or acid equivalent ("T"), a linear aliphatic dicarboxylic acid or acid equivalent ("X"), and 1,3-propanediol ("3G"). In an embodiment, the linear aliphatic acid is sebacic acid. Terephthalic acid equivalents for the purpose of the present disclosure include, for example, esters (such as dimethyl terephthalate), and ester-forming derivatives such as acid halides (e.g., acid chlorides) and anhydrides. The 1,3-propane diol is preferably of the type that is obtained biochemically from a renewable source. The polycondensation is carried out using conventional means, for example, as described in U. Witt et al., *Macromolecular Chemistry and Physics,* 195, 793-802 (1994) for the preparation of polyesters based on terephthalic acid or acid equivalent, 1,3-propanediol, and aliphatic dicarboxylic acid or acid equivalent. Alternatively, the composition can be prepared by transesterification of poly(trimethylene terephthalate) ("3GT") with the aliphatic dicarboxylic acid or acid equivalent.

The copolyester used in the compositions disclosed herein is based on 3G, T, and X in a molar ratio 3G:T:X of 100:80:20 to 100:74:26. This can be represented for X=sebacic acid as the formula:

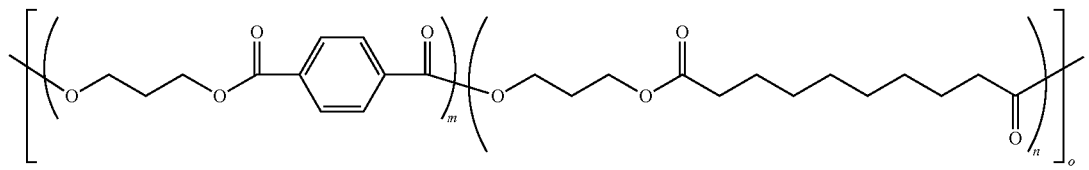

wherein for sebacic acid, X is from about 20 to 26 mole percent. In some embodiments, the sebacic acid mole percent can be between and optionally include any two of the following values: 20, 21, 22, 23, 24, 25 and 26.

It is generally preferred that the copolyesters have sufficiently high molecular weights to provide suitable strain hardening and melt viscosity for processing into shaped articles, and useful levels of mechanical properties in said articles. Generally, weight average molecular weights (Mw) from about 20,000 g/mol to about 150,000 g/mol are useful. More typical are Mw from about 50,000 g/mol to about 130,000 g/mol. Most typical are Mw from about 80,000 g/mol to about 110,000 g/mol. In practical terms, molecular weights are often correlated to solution viscosities, such as intrinsic or inherent viscosity. While the exact correlation depends on the composition of a given copolymer, the molecular weights above generally correspond to intrinsic viscosity values from about 0.5 dL/g to about 2.0 dL/g. The copolyesters used in the present invention are characterized by IV values from about 1.40 dL/g to about 1.65 dL/g. In various embodiments, the IV is between and optionally including any two of the following values: 1.40, 1.45, 1.50, 1.55, 1.60, and 1.65 dL/g.

Although the copolyesters prepared by the processes disclosed herein reach satisfactory molecular weights, it can be expedient to use chain extenders to increase the molecular weights and minimize their thermal history, while reducing the temperature and contact time of the interchange and polycondensation steps. Suitable chain extenders include diisocyanates, polyisocyanates, dianhydrides, diepoxides, polyepoxides, bis-oxazolines, carbodiimides, and divinyl ethers, which can be added at the end of the polycondensation step, during processing on mechanical extrusion equipment, or during processing of the copolyesters into desired shaped articles. Specific examples of desirable chain extenders include hexamethylene diisocyanate, 4,4'-diphenylmethane diisocyanate ("MDI"), and pyromellitic dianhydride. Such chain extenders are typically used at 0.1 to 2 weight percent with respect to the copolyesters.

The molecular weights of the copolyesters can also be increased by post-polymerization processes, such as solid-phase polymerization and vacuum extrusion, both of which allow the efficient removal of any volatiles generated by polycondensation at their respective scales of temperature and time. The benefit of these processes is that the composition of the copolyesters remains unperturbed by the processing conditions. In solid-phase polymerization, a polyester or copolyester is held at a temperature below its melting point, more typically below the temperature at which the polymer particles begin to stick, and subjected to vacuum or a flow of dry atmosphere. This process is most beneficial for polyesters, such as polyethylene terephthalate, polytrimethylene terephthalate, and polybutylene terephthalate, which contain little or no comonomers that substantially reduce their melting points, typically greater than 200° C. In vacuum extrusion, a polyester or copolyester is fed to a mechanical extruder at a suitable temperature to melt the polymer, and then subjected to high vacuum. This process is most beneficial for copolyesters, including all of the compositions whose preparation is described herein, due to their lower melting points, typically less than 200° C. In each process, the temperature and time that is needed to obtain the necessary increase in molecular weight due to polycondensation can be determined by taking samples or by monitoring the process outputs, such as the torque reading for the mechanical extruder.

Suitable mechanical extruders on which to process the copolyesters are well-known in the art and can be purchased from commercial vendors.

In some embodiments, the melt viscosity can be modified by the use of branching agents. The branching agents are incorporated during polymerization. Suitable branching agents include trifunctional and polyfunctional compounds containing carboxylic acid functions, hydroxy functions, or mixtures thereof. Specific examples of desirable branching agents include: 1,2,4-benzenetricarboxylic acid (trimellitic acid); trimethyl-1,2,4-benzenetricarboxylate; 1,2,4-benzenetricarboxylic anhydride (trimellitic anhydride); 1,3,5-benzenetricarboxylic acid (trimesic acid); 1,2,4,5-benzenetetracarboxylic acid (pyromellitic acid); 1,2,4,5-benzenetetracarboxylic dianhydride (pyromellitic dianhydride); 3,3',4,4'-benzophenonetetracarboxylic dianhydride; 1,4,5,8-naphthalenetetracarboxylic dianhydride; 1,3,5-cyclohexanetricarboxylic acid; pentaerythritol; glycerol; 2-(hydroxymethyl)-1,3-propanediol; 1,1,1-tris(hydroxymethyl)propane; 2,2-bis(hydroxymethyl)propionic acid; and mixtures thereof. Such branching agents are typically used at 0.01 to 0.5 mole percent with respect to the dicarboxylic acid component or the glycol component, as dictated by the majority functional group of the branching agent. High branch content in aliphatic-aromatic copolymers can reduce the percentage crystallinity, which influences the strain hardening during the melt blowing process or the solid-state deformation process. Therefore, based on the percentage of aliphatic comonomer, it may be necessary to adjust branch content in the copolymer.

Additionally, the rate of crystallization and the strain hardening parameters can be adjusted to an extent by incorporating nucleating agents during polymerization or processing of the copolyesters to accelerate their crystallization rates and to provide sufficiently high degree of molecular orientation during the film stretching process leading to improvement in the mechanical properties (Ramesh M Gohil, *Polymer Engineering and Science,* 49(3), p. 544, 2009). For injection molding of parts and articles, the presence of nucleating agents helps to increase the rate of crystallization at relatively high temperature so that productivity is enhanced. Particularly suitable nucleating agents include sodium salts of carboxylic acids and polymeric ionomers partially or fully neutralized with sodium cations. If incorporated during polymerization, lower molecular weight sodium salts are typically used and can be added with the monomers or later in the process, such as after completion of the interchange step and before or during the polycondensation step. If compounded into a finished copolyester, higher molecular weight sodium salts and the polymeric ionomers are typically used and can be added during mechanical extrusion with sufficient mixing. Specific examples of desirable nucleating agents include: sodium acetate, sodium acetate trihydrate, sodium formate, sodium bicarbonate, sodium benzoate, monosodium terephthalate, sodium stearate, sodium erucate, sodium montanate (e.g., Licomont® NaV 101, made by Clariant International, Ltd., Muttenz, Switzerland), DuPont™ Surlyn® sodium ionomers (ethylene-methacrylic acid sodium ionomers, made by E.I. du Pont de Nemours and Company, Wilmington, Del., USA) and AClyn® 285 (low molecular weight ethylene-acrylic acid sodium ionomer, Honeywell International, Inc., Morristown, N.J., USA). Such nucleating agents are typically used at levels that deliver 10 to 1000 ppm sodium with respect to the weight of the copolyesters.

2. Gelatinized and Unmodified Starches

The copolyester is blended with starch when used in making a film. The amount of starch is about 15 to 50 percent by weight of the blend. In an embodiment, the amount of starch is from about 25 to about 50 weight percent. In an embodiment, the amount of starch is from about 25 to about 35 weight percent. In some embodiments, the amount of starch is between and optionally including any two of the following values: 15, 20, 25, 30, 35, 40, 45, and 50 percent by weight of the blend.

Any starch, including those described below, is suitable for use as the first additive component of the copolyester/starch blend composition. Commercial sources of starch include but are not limited to cereal grains or root crops such as wheat, corn, rice, oat, arrowroot, pea and potato.

Examples of commercially available natural starches include native common corn starch, available as Cargill Native Gel® 03420 from Cargill, Inc., Cedar Rapids, Iowa, USA, and hydrolyzed potato starch, available as PEN-BIND®800 starch from Penford Food Ingredients, Centennial, Colo., USA. Another starch that may be used is ReNew® 400 resin, available from StarchTech, Inc, Golden Valley, Minn., USA and is comprised of starch and optionally biodegradable polymers. The starch used is an unmodified industrial grade starch, typically from wheat, corn, and/or potato. BIOPLAST GF 106/02, referred to herein as "BT Starch," available from BIOTEC Biologische Naturverpackungen GmbH & Co., Emmerich, Germany, is a plasticizer-free thermoplastic material made from potato starch.

Starch can also be derivatized or modified by typical processes known in the art, e.g., esterification, etherification, oxidation, acid hydrolysis, crosslinking and enzyme conversion. Other starch derivatives include thermoplastic starch, cationic starch, anionic starch, alkyl starches, amine starches and dialdehyde starches. Anhydrides such as maleic, phthalic, or octenyl succinic anhydride can also be used to produce ester derivatives. These and other conventional modifications of starch are described in publications such as *Starch: Chemistry and Technology,* Second Edition, edited by Roy L. Whistler et al. Chapter X: "Starch Derivatives: Production and Uses," by M. W. Rutenberg et al., Academic Press, Inc., 1984. Thermoplastic starch can be produced, for example, as disclosed in U.S. Pat. No. 5,362,777. Combinations of the various starches and starch derivatives listed above can also be used.

Water "gelatinizes" (a process also known as destructuring or melting) the starch to form a polymeric gel structure. In order to provide appropriate starch gelatinization, high water levels are used. Once gelatinized, excess water can be removed from the starch composition by drying the composition to reach relatively low water levels before the composition is further processed. Water may also act as a plasticizer in that it softens the material or reduces the modulus. The rheology of the composition is strongly influenced by the presence of water. High water content of the composition, such as above 10 weight %, results in relatively low viscosity. A low water content, such as 0.5 weight water, results in much higher viscosity of the composition.

It is desirable that the total moisture content of the starch-containing composition be at a level of 25% or less by weight. By total moisture or water content is meant both the residual moisture of the starch (that is the amount absorbed while stored at ambient conditions) and the amount of water fed to the polymer processing equipment, e.g. an extruder. Typically, starch may contain about 9 to 12% residual moisture before drying. "Pre-gelatinized" starch may have about 6 weight % water or less after drying. The desired quantity of water is that which will allow the material to be processed, for example mixing and heating to the desired temperatures. While some water may be added to the extruder, only an amount which will bring the total moisture level to 25% or less can be added.

Addition of a polyol plasticizer is used to improve processibility when the starch is a "non-thermoplastic starch." The starch can be supplied already containing the plasticizer, or a plasticizer can be added as part of the blend preparation. Suitable polyol plasticizers include organic compounds containing more than one hydroxyl group per molecule or derivatives thereof. Derivatives of the polyols include esters such as acetates. Preferred polyol plasticizers have a molecular weight in the range of 50-6000, more preferably 50-2500, and still more preferably 100-400. They are preferably selected from the group consisting of: sorbitol, glycerol (also known as glycerin), maltitol, xylitol, mannitol, erythritol, di- or polyglycerol, glycerol mono- and diesters of fatty acids, glycerol acetates such as glycerol mono- or diacetate, polyethylene oxide, ethylene glycol, diethylene glycol or polyethylene glycol, trimethylolpropane, pentaerythritol. More preferably, they comprise glycerol, maltitol, sorbitol, erythritol and/or xylitol. Other plasticizers which can be used include invert sugar and corn syrup. In an embodiment, the polyol plasticizer is glycerol. In an embodiment, the polyol plasticizer present is between about 5 and about 10 wt % of the blend composition. In some embodiments, the polyol plasticizer present is between and optionally including any two of the following values: 5, 6, 7, 8, 9, and 10 wt % of the blend composition.

Mixtures of plasticizers may be desirable, since a high level of a single plasticizer may result in incomplete mixing with the starch. Useful mixtures of plasticizers include a mixture of at least two plasticizers selected from the group consisting of glycerol, maltitol, sorbitol, erythritol and xylitol, such as a mixture of sorbitol, maltitol and glycerol, and a mixture of sorbitol, xylitol and glycerol. Another useful combination includes water and glycerin, such as a combination, by weight, of about 6 parts glycerin and 4 parts water.

3. Polylactic acid (PLA)

Polylactic acid is an aliphatic polyester made up of lactic acid (2-hydroxy propionic acid) building blocks. PLA is becoming an important industrial chemical because it is a biodegradable plastic that is not derived from petroleum. PLA is derived from corn, potatoes, and various plants. Any grade of PLA can be used for practicing this invention. The preferred poly(lactic acid) (PLA) is a 100% bio-derived polymer, prepared catalytically from L(–)lactide, preferably having a melting point of 130-200° C. The intrinsic viscosity of the PLA is preferably at least about 0.7 dL/g, more preferably at least about 0.9 dL/g, and is preferably at up to about 2.0 dL/g, more preferably up to about 1.6 dL/g. PLAs suitable for practicing this invention are commercially available from Cargill, Inc., Cedar Rapids, Iowa, USA. One preferred grade is Cargill PLA Polymer 2002D, a grade designed for processing by extrusion and thermoforming.

In an embodiment, the PLA is about 6 to about 13 wt % of the blend composition. In some embodiments, the wt % PLA is between and optionally including any two of the following values: 6, 7, 8, 9, 10, 11, 12, and 13 wt %.

4. Graft Copolymers

The blends described herein comprise graft copolymers obtained from copolymerization of a polyolefin or polystyrene with a comonomer containing a polar reactive functional group. Examples of polyolefins include: polyethylenes, polypropylenes, ethylene propylene rubbers, and EPDM rubbers. Comonomers having polar reactive functional groups include maleic anhydride, citraconic anhydride, itaconic anhydride, and tetrahydrophthalic anhydride. They also include maleic acid, citraconic acid, itaconic acid, fumaric acid, tetrahydrophthalic acid and the corresponding salts, monoesters or diesters of these acids. Graft copolymers are well-known in the polymer art. In an embodiment, the polyolefin is a polyethylene and the comonomer is maleic anhydride. In another embodiment, the graft copolymer is polystyrene-graft-maleic anhydride (PS-g-MA)

5. Hindered Phenol Antioxidants

The addition of a hindered phenol antioxidant can increase the maximum draw, melt Index, and Young's modulus of the copolyester/PLA/starch/graft copolymer blend composition. Examples of suitable hindered phenol antioxidants include: p-hydroxyphenylcyclohexane; bis(p-hydroxyphenyl)cyclohexane; 1,1-bis(m-cresyl)propane; 1,1,3-tris(2-methyl-4-hydroxy-5-tert-butylphenyl)butane; tetra-tris-methylene-3-(3', 5'-di-tert-butyl-4'-hydroxyphenyl)propionate methane; 2,6-di-tert-butyl-4-methylphenol; 2,4,6-tri-tert-butylphenol; 1,1'-methylene-bis(4-hydroxy-3,5-tert-butylphenol); 2,2'-methylene-bis(4-methyl-6-tert-butylphenol); 2,6-(2-tert-butyl-4-methyl-6-methylphenol-p-cresol); 1,4'-butylidene(6-tert-butyl-m-cresol); phenylethylpyrocatechol; phenylisopropylpyrocatechol; 2,2'-thiobis(4-methyl-6-tert-butylphenol); and 4,4'-thiobis(3-methyl-6-tert-butylphenol). In an embodiment, the hindered phenol antioxidant is 3-(3,5-di-tert-butyl-4-hydroxyphenyl) propionate.

The hindered phenol antioxidant is present in an amount between about 0.5 and 5.0 wt % of the blend, in one embodiment, between 0.5 and 1.0 wt %. In some embodiments, the hindered phenol antioxidant is present in an amount between and optionally including any two of the following values: 0.5, 0.75, 1.0, 1.5, 2.0, 2.5, 3.0, 3.5, 4.0, 4.5, and 5.0 wt %.

6. Optional Additives

The blends, and the shaped articles formed therefrom, can include any known additive used in polyesters as a processing aid or for end-use properties. Such additives include, but are not limited to, compatibilizers for the polymer blend components, thermal and UV stabilizers, flame retardants, flow enhancers, slip agents, rheology modifiers, lubricants, tougheners, pigments, antiblocking agents, inorganic and organic fillers, such as silica, clay, talc, chalk, titanium dioxide, carbon black, wood flour, keratin, chitin, refined feathers and reinforcing fibers, such as glass fibers and natural fibers like paper, jute and hemp.

Blend Preparation

The blend compositions can be prepared by conventional blending technique. Usually, the copolyester is dried before processing. The drying conditions are determined by the specific polyesters and the specific optional phosphorus-containing stabilizer used. One typical set of conditions is to dry the polyesters at 100° C. for 16 hours under vacuum with a small nitrogen flow. The mixture is heated at a temperature sufficient to form a melt blend. The temperature should be above the melting points of each component but below the lowest decomposition temperature. The temperature is typically in the range of about 220° C. to about 270° C.

A melt compounding process is used to prepare the blends, utilizing any known intensive mixing process, such as mixing in a HAAKE Rheocord Mixer (available from Thermo Fisher Scientific Inc., Waltham, Mass., USA) or Brabender® mixer (available from C. W. Brabender® Instruments, Inc., South Hackensack, N.J., USA) or extrusion through a twin-screw extruder. Preferably, a twin-screw extruder is used. The resin component (a) and optional phosphorous-containing stabilizers (b) are intimately mixed and fed to the mixer or extruder. Desired other ingredients may be part of the intimate mixture or may be co-fed or added at separate stages during the compounding or in a subsequent step. For example, pellets can be formed by extruding a mixture containing only the polyester components and phosphorous-containing stabilizer, and the pellets can be compounded with other ingredients in a separate step. In an embodiment, the composition is made by melt blending the 3GTX and the starch to form a first polymer blend; separately melt blending the polylactic acid with the PE-g-MA or PS-g-MA and hindered phenol antioxidant to form a second polymer blend; and then combining the first polymer blend and the second polymer blend by melt blending.

The blends can be extruded or co-extruded into film, spun into fibers, or formed into shaped articles in a continuous manner following melt compounding, or in a separate step.

Uses

The blends can be used to make a wide variety of shaped articles. The blends can be formed into such shaped articles using any known process therefore, including thermoplastic processes such as compression molding, thermoforming, extrusion, coextrusion, injection molding, blow molding, melt spinning, film casting, film blowing, lamination, foaming using gases or chemical foaming agents, or any suitable combination thereof to prepare the desired shaped article. Shaped articles that can be made from the blends include films (non-oriented, uni- and biaxially oriented films), multilayer films, sheets, multilayer sheets, fibers, filaments, bags, melt blown containers, molded parts such as cutlery, coatings, polymeric melt extrusion coatings on substrates, laminates, and bicomponent, multi-layer, and foamed varieties of such shaped articles.

In some embodiments, articles include packaging for food, waste, personal care (health and hygiene) items, and cosmetics. By "packaging" is meant either an entire package or a component of a package. Examples of packaging components include packaging film, liners, shrink bags, shrink wrap, trays, tray/container assemblies, replaceable and non-replaceable caps, lids, lidding material, bowls, garbage bags, medical laundry bags, laundry detergent pouches, chemical bags, coffee pods, tea pods, cocoa pods, and drink bottle necks.

The package can be in any form appropriate for the particular application, such as a can, box, bottle, jar, bag, cosmetics package, or closed-ended tube. The packaging can be fashioned by any means known in the art, such as extrusion, coextrusion, thermoforming, injection molding, lamination, or blow molding. Some specific examples of packaging for personal care items and cosmetics include bottles, jars, and caps for food and for prescription and non-prescription capsules and pills; solutions, creams, lotions, powders, shampoos, conditioners, deodorants, antiperspirants, and suspensions for eye, ear, nose, throat, vaginal, urinary tract, rectal, skin, and hair contact; and lip products.

It is desirable for shaped articles, particularly those that find use in packaging, including films, bags, containers, cups, and trays among others, to be compostable. The current standards for compostable packaging and packaging materials are described in ASTM D6400-04 and EN 13432:2000. As the more stringent standard, EN 13432 is more pertinent for the qualification of new compostable packaging materials. To qualify as compostable, the packaging must disintegrate in 3 months under the conditions of an industrial composting facility and biodegrade to carbon dioxide at the level of 90% in 6 months without any negative impact due to toxicity on the composting process or on plant growth using the resulting compost. In this regard, the blends disclosed herein can be said to be biodegradable when their shaped articles used as packaging materials, such as films, are shown to be compostable. In a typical embodiment of this invention, the shaped articles comprise films that are compostable at thicknesses of up to 20 microns, more typically up to 70 microns, in some embodiments up to 120 microns, and in yet other embodiments greater than 120 microns.

The blends are compostable, possess sufficient melt strength for processing such as film blowing, and produce films with desirable physical properties. The presence of the combination of PLA, starch, the graft copolymer, and a hindered phenol antioxidant improves copolyester melt strength and provides films with improved toughness, versus the aliphatic-aromatic copolyester alone or plus any one or two of these ingredients.

EXAMPLES

The present invention is further illustrated in the following Examples. It should be understood that these Examples, while indicating some preferred embodiments of the invention, are given by way of illustration only. From the above discussion and these Examples, one skilled in the art can ascertain the essential characteristics of this invention, and without departing from the spirit and scope thereof, can make various changes and modifications to adapt it to various uses and conditions.

The meaning of abbreviations is as follows: "3GT/Sebacic" means a copolyester made from monomers comprising 1,3-propanediol, terephthalic acid, and sebacic acid, "cm" means centimeter(s), "cN" means centinewtons, "dL" means deciliter, "elong" means elongation, "g" means gram(s), "mg" means milligram(s), "IV" means intrinsic viscosity, "max draw" means maximum draw-down ratio, "h" means hour(s), "min" means minute(s), "MDI" means 4,4'-diphenylmethane diisocyanate, "MI" means melt index, "min" means minute(s), "mm" means millimeter(s), "mg" means milligram(s), "MPa" means megapascal(s), "NaOAc" means sodium acetate, "PE-g-MA means polyethylene-graft-maleic anhydride copolymer; "PLA" means polylactic acid, "ppm" means parts per million, "PS-g-MA means polystyrene-graft-maleic anhydride copolymer, "RPM" means revolutions per minute, "TS" means tensile strength, "wt %" means weight percent(age), "RH" means relative humidity, and "YM" means Young's modulus.

The copolyester designation "3GT/X [α]" denotes a copolyester made from monomers comprising 1,3-propanediol (3G), terephthalic acid (T), and linear aliphatic dicarboxylic acid (X), where "a" is the mole percent of total dicarboxylic acid X. For example, 3GT/Sebacic [25%] denotes a poly(trimethylene terephthalate-co-sebacate) wherein 25 mol % of the dicarboxylic acid moieties are sebacate, and the remaining 75 mol % are terephthalate.

Materials:

NatureWorks® PLA polymer 2002D, a grade derived from annually renewable sources and specifically designed for extrusion and thermoforming applications, was obtained from NatureWorks LLC (Minnetonka, Minn., USA)

Renewably sourced 1,3-propanediol (Bio-PDO™) was obtained from DuPont Tate & Lyle (Loudon, Tenn., USA).

BIOPLAST GF 106/02, referred to herein as "BT Starch," was obtained from BIOTEC Biologische Naturverpackungen GmbH & Co., Emmerich, Germany. BIOPLAST GF 106/02 is a plasticizer-free thermoplastic material made from potato starch.

Cargill Gel® 03420 starch was obtained from Cargill, Inc., Cedar Rapids, Iowa, USA. It is a gelatinized corn starch that consists of 25% amylose and 75% amylopectin. It is a non-thermoplastic starch.

PE-g-MA, maleic anhydride grafted polyethylene, CAS #9006-26-2, was purchased from Sigma-Aldrich, St. Louis, Mo., USA. The viscosity is in the range of 1700-4500 cps. The saponification value is in the range of 30-40 mg KOH/g.

Sodium acetate ("NaOAc"), 4,4'-diphenylmethane diisocyanate ("MDI"), terephthalic acid, sebacic acid, and PS-g-MA (maleic anhydride grafted polystyrene, 2 wt % grafted maleic anhydride), were obtained from Sigma-Aldrich.

Irganox® 1010 antioxidant [3-(3,5-di-tert-butyl-4-hydroxyphenyl)-propionate] was obtained from BASF Corporation (Florham Park, N.J., USA)

AClyn® 285, a low molecular weight ethylene-acrylic acid sodium ionomer, was obtained from Honeywell International, Inc., (Morristown, N.J., USA).

3GTX (X=sebacate) copolyester was prepared according to the procedure of International Application Number PCT/US09/67863, with 50 mole % of 1,3-propanediol, 24.7 mole % of dimethyl terephthalate, 25.3 mole % of sebacic acid, and 300 ppm Na from sodium acetate trihydrate. The polymer IV was about 1.276 dL/g and its MI was 5 g/10 min. The MI of the 3GTX was reduced to 2.6 by a reaction extrusion process conducted using a 30 mm twin-screw extruder. Barrel temperature set points were 160° C. 4,4'-Diphenylmethane diisocyanate (0.3 wt %) and 0.5 wt % AClyn® 285 were added to the polymer and introduced into the feed hopper of the extruder. Care was taken to keep the MDI dry before and as it was entering the extruder.

Test Methods

The intrinsic viscosity (IV) of the copolyesters was determined using a Viscotek Forced Flow Viscometer (FFV) Model Y-501C. The polymers were dissolved in 50/50 weight % trifluoroacetic acid/methylene chloride at a 0.4% (weight/volume) concentration at 19° C. A sample size of 0.1000 g polymer was typically used to prepare 25 mL of solution. The intrinsic viscosity values reported by this method were equivalent to values determined using Goodyear Method R-103B "Determination of Intrinsic Viscosity in 50/50 [by weight] Trifluoroacetic Acid/Dichloromethane".

Tensile properties (tensile strength, elongation at break, Young's modulus) of the films were determined according to ASTM procedure D882. For quickly achieving equilibrium at 50% RH, samples were first conditioned for at least 48 h at 23° C. at 65% RH. Films were cut into strips measuring 0.25" (0.635 cm) wide using a Thwing-Albert cutter. Strips were exposed to 50% RH (to satisfy ASTM requirements) at 23° C. for at least 45 min and then tested on a load frame utilizing a 2000 g maximum load cell. Instron extension rates were 5"/min (12.7 cm/min) and 20"/min (50.8 cm/min) with grip separation (gage length) of 0.986" (2.50 cm). For many packaging applications, it is desirable for percent elongation at break to be greater than 250 at an extension rate of 20"/min (50.8 cm/min). Toughness of the film can be judged by area under a stress-strain curve or from elongation and stress at break. A large difference in % elongation at break is indication of toughness.

Melt Index (MI) of dried polymer samples was measured at 190° C. under a 2160 g load. The instrument used was a Kayness Capillary Rheometer from Dynisco (Franklin, Mass., USA).

Melt strength is the product of maximum melt draw, which is reported as a percentage, and melt tension, which is measured in cN. Measurements were carried out at 160° C. using dried polymer samples. The samples were melted in a Kayness Capillary Rheometer 8052 from Dynisco (Franklin, Mass., USA). Melted polymer was collected using a Rheotens melt tensile tester from Göttfert GmbH, (Buchen, Germany). Data were recorded on a Soltec X-Y Recorder, VP-6415S. Melt strength provides information which allows one to judge bubble stability and strain hardening character to achieve high molecular orientation in blown films and good gage uniformity across a web. For many packaging applications, it is desirable for melt strength to be greater than 450 cN under processing conditions.

For film and extrudate preparation, polymers were dried overnight at 100° C. under partial vacuum with a small nitrogen flow. Unless otherwise noted, starch was not dried before melt blending. The extruder used was DSM Instruments Micro 15 (Netherlands). Resins were extruded at a melt temperature of 160-190° C. with a 4 min mix, 200 RPM, using a 0.4 mm ribbon die for achieving 8-12 mil (0.20-0.30 mm) thick films.

Example 1

This example demonstrates the change in properties of poly(trimethylene-terephthalate-co-sebacate), 75:25 film (Comparative Example A, "Comp A"), where 75:25 refers to the molar ratio of terephthalate to sebacate moieties, caused by melt blending with BT starch only (Comparative Example B, "Comp B") and with starch plus PLA (Example 1). Sodium acetate was used as a nucleating agent. Samples were prepared and tested as described above. Compositions and results are presented in Table 1. While adding starch (Comp B) significantly lowers tensile strength, elongation at break, melt tension, max draw, and melt strength, adding PLA with the starch (Example 1) restores these properties at least to some extent and actually increases max draw and melt strength to higher values than the parent copolyester, comp A. Comparison of % elongation at break of samples Comp B and Example 1 reveals that the film toughness of Example 1 is improved with respect to both Comp B and Comp A.

TABLE 1

| Example | Copolyester Composition | Additives | YM (MPa) 5"/min/ 20"/min | TS at Break (MPa) 5"/min/ 20"/min | % Elong 5"/min/ 20"/min | Melt Index (g/10 min) | Melt Tension (cN) | Max Draw (%) | Melt Strength (cN) |
|---|---|---|---|---|---|---|---|---|---|
| Comp A | 3GT/Sebacic [25%]; NaOAc [300 ppm] IV = 1.51 dL/g | NONE | 94/92.2 | 28.1/12.8 | 980/526 | 4.8 | 4.5 | 65.9 | 297 |
| Comp B | 3GT/Sebacic [25%]; NaOAc [300 ppm] IV = 1.51 dL/g | 34 wt % BT Starch | 104/104 | 4.8/5.7 | 35/12 | 4.7 | 2.33 | 27.9 | 65.0 |
| 1 | 3GT/Sebacic [25%]; NaOAc [300 ppm] IV = 1.51 dL/g | 34 wt % BT Starch; 8 wt % PLA | 122/111 | 6.0/5.5 | 320/283 | 3.37 | 3.4 | 104 | 353 |

Example 2

This example demonstrates the effects of Cargill Starch with PLA (Example 2A) and Cargill Starch with both PLA and either PE-g-MA (Example 2B) or PS-g-MA (Example 2C, with dried starch) on the properties of a poly(trimethylene-terephthalate-co-sebacate) (25%) copolyester that was prepared with MDI as a chain extender and ACIyn® 285 sodium ionomer as a nucleating agent (Comparative Example C, "Comp C"). Samples were prepared and tested as described above. Compositions and results are presented in Table 2. Both samples of Examples 2B and 2C, containing graft copolymer, exhibited more than double the melt strength of the copolyester or copolyester plus starch and PLA, and were far above a target 450 cN. Higher values of % elongation and stress at break than that of the sample Example 2A are indicative of increased film toughness. The sample of Example 2B, containing 5 wt % PE-g-MA, also exhibited improved elongation at break (i.e., greater than about 250%).

Example 3

This example demonstrates the effects of increasing amounts of PE-g-MA (3B=2.5 wt %, 3C=5 wt %) on the properties of a poly(trimethylene-terephthalate-co-sebacate) (25-25.75%) copolyester (IV=1.48-1.56 dL/g) blended with dried Cargill starch, glycerol as a plasticizer, and PLA (3A), but no nucleating agent or MDI. Samples were prepared and tested as described above. Compositions and results are presented in Table 3. Examples 3A, 3B, and 3C each exceeded the melt strength and elongation at break targets (greater than 450 cN and greater than 250%, respectively). Example 3B, having 2.5 wt % PE-g-MA, exhibited the highest max draw. Example 3C, having 5 wt % PE-g-MA, exhibited the highest Young's modulus.

TABLE 2

| Ex. | Copolyester Composition | Additives | YM (MPa) 5"/min/ 20"/min | TS at Break (MPa) 5"/min/ 20"/min | % Elong 5"/min/ 20"/min | Melt Index (g/10 min) | Melt Tension (cN) | Max Draw (%) | Melt Strength (cN) |
|---|---|---|---|---|---|---|---|---|---|
| Comp C | 3GT/Sebacic [25%]; MDI [0.9 wt %]; ACIyn ® 285 [0.5 wt %] IV = 1.57 dL/g | NONE | 82/82.2 | 21.5/13.8 | 817/569 | 3.8 | 7.53 | 48.2 | 363 |
| 2A | 3GT/Sebacic [25%]; MDI [0.9 wt %]; ACIyn ® 285 [0.5 wt %] IV = 1.57 dL/g | 34 wt % Cargill Starch; 10 wt % PLA 2002d | 242/223 | 8.6/8.9 | 9.7/11 | 5.67 | 3.9 | 78.6 | 307 |
| 2B | 3GT/Sebacic [25%]; MDI [0.9 wt %]; ACIyn ® 285 [0.5 wt %] IV = 1.57 dL/g | 34 wt % Cargill Starch; 10 wt % PLA 2002d; 5 wt % PE-g-MA | 285/283 | 7.4/8.0 | 236/255 | 3.95 | 4.27 | 172 | 734 |
| 2C | 3GT/Sebacic [25%]; MDI [0.9 wt %]; ACIyn ® 285 [0.5 wt %] IV = 1.57 dL/g | 34 wt % Cargill Starch (Pre-Dry); 10 wt % PLA 2002d; 5 wt % PS-co-MA | NA/265 | NA/10.3 | NA/143 | 5.17 | 3.8 | 160 | 608 |

TABLE 3

| Example | Copolyester Composition | Additives | YM (MPa) 5"/min/ 20"/min | TS at Break (MPa) 5"/min/20"/min | % Elong 5"/min/ 20"/min | Melt Index (g/10 min) | Melt Tension (cN) | Max Draw (%) | Melt Strength (cN) |
|---|---|---|---|---|---|---|---|---|---|
| 3A | 3GT/Sebacic [25%] IV = 1.56 dL/g | 30 wt % Cargill Starch (dried); 10 wt % PLA; 8 wt % Glycerol | NA/150 | NA/7.5 | NA/310 | 4.06 | 4.2 | 202 | 848 |
| 3B | 3GT/Sebacic [25.75%] IV = 1.48 dL/g | 30 wt % Cargill Starch (dried); 6 wt % PLA 2002d; 8 wt % Glycerol; 2.5 wt % PE-g-MA | 116/124 | 6.8/5.6 | 412/265 | 5.21 | 2.6 | 276 | 718 |
| 3C | 3GT/Sebacic [25%] IV = 1.56 dL/g | 30 wt % Cargill Starch (dried); 6 wt % PLA 2002d; 8 wt % Glycerol; 5 wt % PE-g-MA | 171/176 | 7.6/7.4 | 361/401 | 3.6 | 3.33 | 185 | 616 |

Example 4

This example demonstrates the effects of Irganox®1010 on the properties, particularly max draw and melt strength, of poly(trimethylene-terephthalate-co-sebacate) copolyesters containing Cargill starch, glycerol as a plasticizer, PLA, and PE-g-MA. Samples were prepared and tested as described above. Compositions and results are presented in Table 4. The addition of Irganox®1010 increased melt strength by increasing max draw.

TABLE 4

| Ex. | Copolyester Composition | Additives | YM (MPa) 5"/min/ 20"/min | TS at Break (MPa) 5"/min/20"/min | % Elong 5"/min/ 20"/min | Melt Index (g/10 min) | Melt Tension (cN) | Max Draw (%) | Melt Strength (cN) |
|---|---|---|---|---|---|---|---|---|---|
| 4A | 3GT/Sebacic [25%] IV = 1.56 dL/g | 15 wt % Cargill Starch; 12.4 wt % PLA 2002d; 6.0 wt % Glycerol; 2.5 wt % PE-g-MA | NA/227 | NA/11.8 | NA/299 | 10.2 | 3.8 | 186 | 707 |
| 4B | 3GT/Sebacic [25%] IV = 1.56 dL/g | 15 wt % Cargill Starch; 12.4 wt % PLA 2002d; 6.0 wt % Glycerol; 2.5 wt % PE-g-MA; 1.0 wt % Irganox ® 1010 | NA/206 | NA/11.4 | NA/330 | 8.3 | 3.6 | 208 | 749 |
| 4C | 53.8 wt % 3GT/Sebacic [25.3%]; NaOAc [300 ppm]; 0.3 wt % MDI; IV = 1.55 dL/g | 25% Cargill Starch; 6.0 wt % Glycerol; 12.4 wt % PLA 2002d; 2.5 wt % PE-g-MA | 297/266 | 9.6/9.9 | 259/286 | 6 | 4 | 183 | 732 |
| 4D | 53.1% 3GT/Sebacic [25.3%]; NaOAc [300 ppm]; 0.3 wt % MDI; IV = 1.55 dL/g | 25% Cargill Starch; 12.4 wt % PLA 2002d; 6.0 wt % Glycerol; 2.5 wt % PE-g-MA; 1.0 wt % Irganox ® 1010 | NA/278 | NA/9.05 | NA/257 | 7.88 | 3.4 | 244 | 830 |

What is claimed is:

1. A composition comprising a melt blend of
   (a) 50 to 70 wt % copolyester made from monomers comprising 1,3-propanediol, terephthalic acid, and a linear aliphatic dicarboxylic acid, wherein the molar ratio of terephthalic acid to linear aliphatic acid is between 75:25 and 80:20;
   (b) 15 to 50 wt % starch;
   (c) 6 to 13 wt % polylactic acid;
   (d) 0.5 to 5.0 wt % graft copolymer of a polyolefin or a polystyrene; and
   (e) optionally 0.5 to 5.0 wt % hindered phenol antioxidant.

2. The composition of claim 1, wherein the linear aliphatic dicarboxylic acid is sebacic acid.

3. The composition of claim 1, wherein the graft copolymer is polyethylene-graft-maleic anhydride or polystyrene-graft-maleic anhydride.

4. The composition of claim 1, wherein the hindered phenol antioxidant is 3-(3,5-di-tert-butyl-4-hydroxyphenyl)propionate.

5. The composition of claim 1, further comprising a nucleating agent.

6. The composition of claim 1, further comprising a chain extender.

7. The composition of claim 1, wherein the starch is a thermoplastic starch.

8. The composition of claim 1, wherein the starch is gelatinized and comprises a polyol plasticizer.

9. The composition of claim 8, wherein the polyol plasticizer is glycerol.

10. A film comprising the composition of claim 1 having an elongation at break greater than 250 percent at 20"/min strain rate, and melt strength greater than 450 cN at 160° C.

11. An article comprising the composition of claim 1.

12. The article of claim 11, wherein the article is selected from the group consisting of: non-oriented films, uniaxially oriented films, biaxially oriented films, sheets, fibers, filaments, melt-blown containers, cutlery, liners, shrink bags, shrink wraps, trays, tray/container assemblies, caps, lids, lidding material, bottle necks, cans, boxs, bottles, jars, bags, bowls, cups, coffee pods, tea pods, and cocoa pods.

* * * * *